(12) United States Patent
Bowe, Jr. et al.

(10) Patent No.: US 8,660,931 B2
(45) Date of Patent: Feb. 25, 2014

(54) METHOD AND SYSTEM FOR AUTOMATICALLY GENERATING INVOICES FOR CONTRACTS

(75) Inventors: Thomas W. Bowe, Jr., Pleasanton, CA (US); Sridhar Tadepalli, Richmond, CA (US); Jianfeng Tai, Richmond, CA (US)

(73) Assignee: Siebel Systems, Inc., San Mateo, CA (US)

( * ) Notice: Subject to any disclaimer, the term of this patent is extended or adjusted under 35 U.S.C. 154(b) by 2521 days.

(21) Appl. No.: 10/299,473

(22) Filed: Nov. 18, 2002

(65) Prior Publication Data

US 2007/0265962 A1    Nov. 15, 2007

Related U.S. Application Data

(63) Continuation of application No. 09/967,862, filed on Sep. 28, 2001, now abandoned.

(51) Int. Cl.
*G06Q 40/00* (2012.01)
(52) U.S. Cl.
USPC ............................................. 705/37; 705/40
(58) Field of Classification Search
USPC .............................................. 705/34, 37, 40
See application file for complete search history.

(56) References Cited

U.S. PATENT DOCUMENTS

| | | | | |
|---|---|---|---|---|
| 5,724,584 | A * | 3/1998 | Peters et al. | 718/101 |
| 6,266,401 | B1 * | 7/2001 | Marchbanks et al. | 379/116 |
| 6,493,680 | B2 * | 12/2002 | Logan et al. | 705/34 |
| 2001/0056362 | A1 * | 12/2001 | Hanagan et al. | 705/7 |
| 2002/0178120 | A1 * | 11/2002 | Reid et al. | 705/59 |

* cited by examiner

*Primary Examiner* — Thomas Dixon
*Assistant Examiner* — Benjamin S Fields
(74) *Attorney, Agent, or Firm* — Campbell Stephenson LLP

(57) ABSTRACT

Techniques to automatically generate invoices for contracts, each of which may include any number of line items. Each contract line item may be associated with (1) a particular invoice plan that defines one or more applicable billing types (e.g., for non-recurring, recurring, and use charges) and any adjustments to the total billed amount, (2) a particular invoicing schedule that defines the timing for the invoice generation, (3) a particular account to which invoices are addressed, and (4) a flag to selectively enable automatic invoice generation. An invoice engine automatically generates invoices for a set of one or more contracts by processing each enabled line item of each contract based on the associated invoice plan and invoicing schedule to generate a set of one or more invoice line items for the contract line item. All invoice line items for each account are aggregated into an invoice for the account.

16 Claims, 13 Drawing Sheets

| Number | IIRC | Additional | Additional Charge | Charge Description | Comments |
|---|---|---|---|---|---|
| 1 | 10 | 1 | $5.00 | 007 Charge | |
| 2 | 20 | 1 | $10.00 | 007 Charge | |
| 3 | 40 | 1 | $15.00 | 007 Charge | |
| 4 | 90 | 1 | $20.00 | 007 Charge | |

Name: 007-Payment Plan
Type: Tiered
Active: Yes
Commit: Yes
Schedule: Monthly
Created By: STADEEPAL
Created: 09/26/2000 6:36:01 PM

FIG. 8

METHOD AND SYSTEM FOR AUTOMATICALLY GENERATING INVOICES FOR CONTRACTS

BACKGROUND OF THE INVENTION

The present invention relates generally to computer processing, and more particularly to techniques to automatically generate invoices for contracts.

Contract management is a ubiquitous challenge faced by many industries and organizations. In many industries, complex products and/or services may be offered, and these offerings may be associated with complex pricing structures, entitlements, billing and service delivery requirements, and so on. Contracts of varying degrees of complexity and scope may then be created and used for these offerings. These contracts define the relationship between contracting parties in relation to the offerings for specific time periods.

In general, a contract may be drafted to include any number of terms and each term may be drafted to cover any matter of importance between contracting parties. For example, a contract may define certain pricing structure, cover certain services, offer certain preventive maintenance, and so on. For each of these terms, different coverage may be negotiated depending on various factors such as, for example, the parties to the contract, the price paid, and so on. Contracts may thus be viewed as comprising various types of unstructured information.

In many instances, executed contracts (i.e., agreements) need to be serviced to enforce the terms of the contracts. For example, for contracts with installment payment plans (e.g., lease contracts) or recurring charges (e.g., rental contracts), periodic payments need to be determined for the contracts and invoiced accordingly. For a medium or large organization, a large number of contracts may need servicing, the contracts may be of varying degrees of complexity and scope, and numerous payment plans may be called out by the contracts.

The task of generating invoices for contracts in a manner to meet the needs and requirements of an organization can be challenging. The challenge often magnifies as the complexity and/or the number of contracts to be serviced increases. Thus, techniques that can be used to efficiently service (invoice) contracts are highly desirable.

SUMMARY OF THE INVENTION

The invention provides techniques to automatically generate invoices for contracts. In one aspect, invoices may be automatically generated for any designated set of one or more contracts, with each contract including any number of line items. Each contract line item typically covers either a specific product or a specific asset, which is a specific instance of a particular product.

In an embodiment, each contract line item may be associated with (1) a particular invoice plan that defines one or more types of billings (e.g., for non-recurring charge (NRC), recurring charge (RC), and use charge) applicable to the contract line item and (2) any adjustments to the total billed amount for the contract line item. The invoice plan for each contract line item may be selected from among a number of predefined invoice plans, or may be a custom invoice plan defined specially for the contract line item. If multiple line items are included in a contract, these contract line items may be associated with the same or different invoice plans. Each contract line item is further associated with a particular invoicing schedule that defines the timing for the generation of invoices (i.e., when invoices are to be generated for the contract line item and for how long). Each contract line item may also be associated with a particular account to which invoices are addressed. The different line items in each contract may be associated with the same or different accounts.

In an embodiment, the automatic invoice generation may be selectively enabled for each contract line item via an "Auto Invoice" flag. This flag may be set (or checked, e.g., by default) to enable automatic generation of invoices for the contract line item, and may be reset (or unchecked, e.g., manually) to disable the feature.

An invoice engine may be executed to automatically generate invoices for a designated set of one or more contracts. In an embodiment, the invoice engine processes each enabled (or set) line item of each contract and generates a set of one or more invoice line items for each enabled contract line item based on its invoice plan and invoicing schedule. Each invoice line item covers a particular billing type (e.g., non-recurring charge, recurring charge, or use charge) or other credits/charges for the contract line item. The invoice engine then generates an invoice for each "active" account (having at least one invoice line item) by aggregating all invoice line items addressed to the account.

Any number of line items in any number of contracts may thus be automatically invoiced to generate any number invoices, each of which may include any number of invoice line items. The automatic and flexible generation of invoice line items from contract line items can greatly simplify the management of contracts. The invoice engine may be executed continually, periodically, or at designated or scheduled times to generate invoices as billings become due. The invoice engine may also be executed interactively to generate invoices at specific times (e.g., as determined by an administrator or an end-user). Various details of the automatic invoice generation are described below.

The invention further provides other methods, computer program products, systems, and user interface menus, capable of implementing various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

FIG. 3 shows an embodiment of a screen that may be used by an administrator or an end-user to view and edit agreements for executed contracts;

FIG. 4A shows an embodiment of a screen that may be used to view and edit a specific agreement;

FIG. 4B shows an embodiment of a screen that may be used to view and edit invoice plan information for a selected agreement line item;

FIGS. 6A and 6B show an embodiment of screens that may be used to view and edit non-recurring charge (NRC) plans;

FIG. 8 shows an embodiment of a screen that may be used to display invoices for an agreement and to enable an end-user to interactively generate an invoice for one or more selected agreement line items.

DESCRIPTION OF THE SPECIFIC EMBODIMENTS

Figure 1:
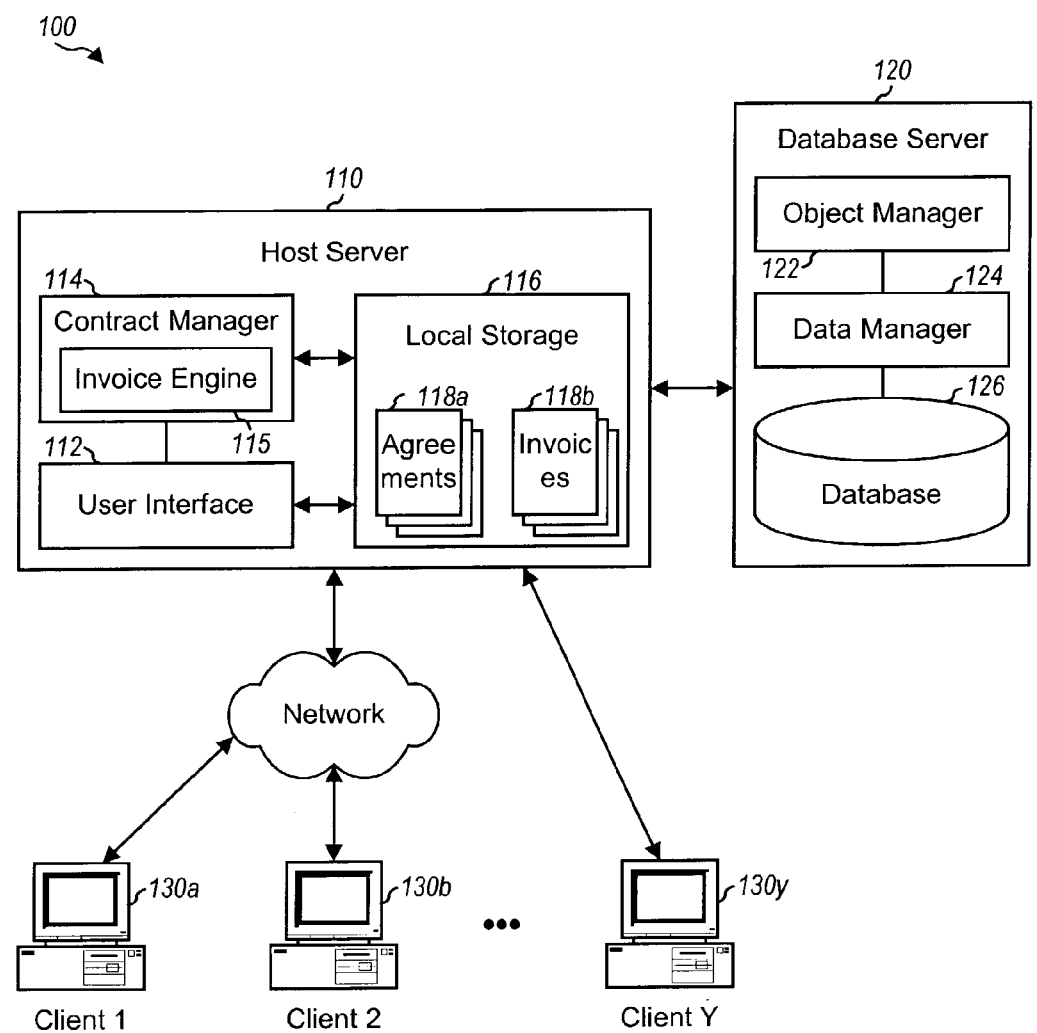
FIG. 1 is a diagram illustrating a specific embodiment of a contract management system.

FIG. 1 is a diagram illustrating a contract management system 100, in accordance with a specific embodiment of the invention. In this embodiment, contract management system 100 is implemented on a set of one or more host servers 110 that couple to and interact with one or more client computers 130 via direct connection, a computer network (e.g., the Internet), and/or some other means. Host server(s) 110 further couple to a database server 120 that stores data (typically in a "raw" form) used by the contract management system.

In an embodiment, contract management system 100 includes a number of modules such as a user interface module 112 and a contract manager 114. Additional, fewer, and/or different modules may also be included in contract management system 100, and this is within the scope of the invention. User interface module 112 provides the interface (e.g., screens) used to present information to an administrator and/or an end-user of the contract management system. User interface module 112 further receives and interprets user commands and data, which may be provided via mouse clicks, mouse movements, keyboard inputs, and other means. User interface module 112 then provides the received data and commands to other modules, which then perform the appropriate responsive action.

Contract manager 114 facilitates the creation and management of contracts. Contract manager 114 provides the necessary screens, tools, templates, and data to support the creation of contracts, as described in U.S. patent application Ser. No. 09/967,895, entitled "Method and System for Instantiating Entitlements into Contracts" filed Sep. 28, 2001, assigned to the assignee of the present application and incorporated herein by reference. Contract manager 114 further includes an invoicing engine 115 that "services" executed contracts (i.e., agreements), e.g., by automatically generating invoices for these contracts, as described in further detail below.

The modules within contract management system 100 may operate on and share the data stored in a central database 126. Typically, raw data from database 126 is retrieved by a module within contract management system 100 and processed into a form more suitable for that module. The processed data is then stored to a local storage 116 to allow for fast and efficient access to the data. In an embodiment, agreements and plans used to generate invoices may be stored in local storage 116. Local storage 116 may be implemented with a semiconductor memory (e.g., RAM, Flash), a hard disk, or some other data storage technology that can provide fast access to the data stored thereon.

In an embodiment, database server 120 manages the central database for contract management system 100 and includes an object manager 122, a data manager 124, and database 126. Object manager 122 manages the interaction with the database and, in an embodiment, includes business objects (BO), business services (BS), and business components (BC) (not shown in FIG. 1 for simplicity). The business objects model major entities (e.g., contracts, templates, and so on) in the contract management system with associated business rules. Each business object is made up of a hierarchy of parent-child components, which model relationship with appropriate specialized operations. The business services are the basic components for building complex behavior. New business services may be created and linked into multi-step control flows to provide complex behavior encompassing multiple business objects. The business components provide real time access to remote objects without replication of data within database 126. A business object may be made up of a number of business components managed by the contract management system.

Data manager 124 manages database 126 and performs this function by invoking SQL objects. Database 126 stores data for the contract management system, and possibly for other systems that may be combined with the contract management system to provide the overall system.

Contract management system 100 provides screens and tools to organize and display agreements (i.e., executed contracts) and to efficiently manage agreements. Contract management system 100 may be used for numerous industries and organizations. As an example, contract management system 100 may be used for any organizations that provide services, offer rentals, sell products, provide leasing or financing, manage resources, and so on.

As used herein, a contract is a document that defines the business relationship between two parties. A contract may be complex and typically describes the obligations to perform, provide, sell, offer, or produce specific activities, responsibilities, products, or services over a determined period of time for a specific amount of money. A contract may cover sales of goods, services, or a combination of both. A contract typically includes detailed descriptions of pricing, terms, limitations, coverage, conditions, legal rights, extension clauses, and other guidelines. A contract can thus include various types of unstructured information. As used herein, an agreement is an executed contract, and the term "contract" may generically refer to either an executed contract (i.e., an agreement) or an unexecuted contract.

The invention provides various techniques to facilitate the management of contracts and to automatically generate invoices (e.g., periodically, as scheduled, or when directed) for these contracts. The automatic generation of invoices supports complex pricing structures, which may increase revenue and profitability for an organization while at the same time reduce operational costs.

Figure 2:
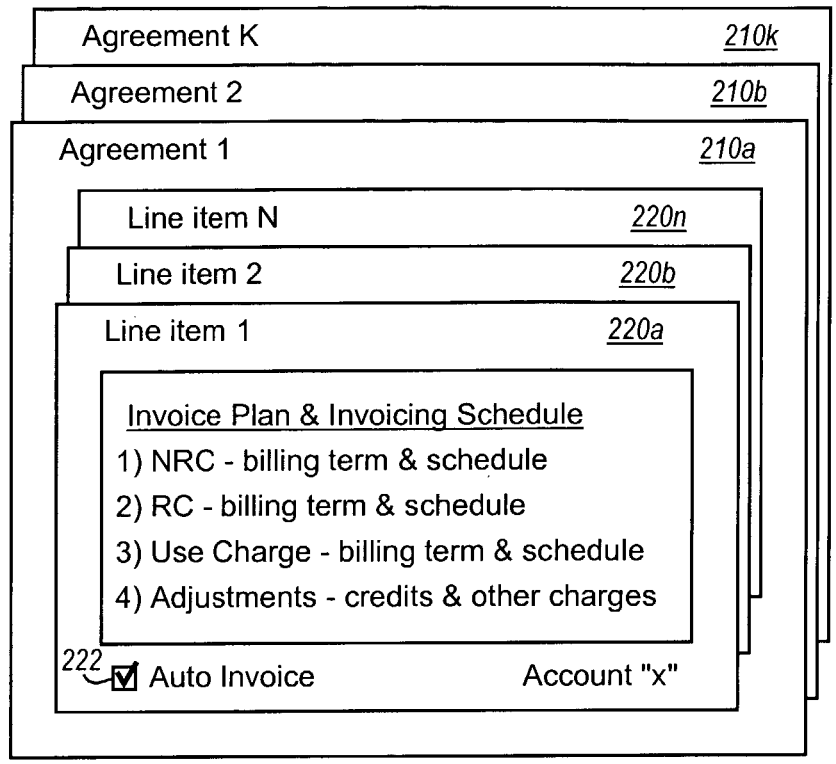
FIG. 2 is a diagram illustrating the automatic generation of invoices, in accordance with an embodiment of the invention.
Figure 2:
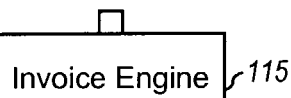
Figure 2:
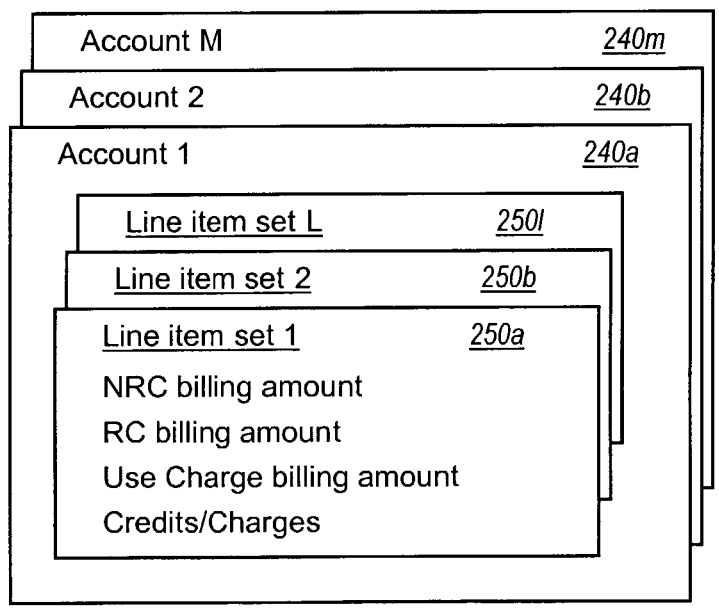

FIG. 2 is a diagram illustrating the automatic generation of invoices, in accordance with an embodiment of the invention. In an aspect, invoices may be automatically generated for any designated set of one or more executed contracts (i.e., agreements) 210. Each agreement 210 may include any number of line items 220. Each agreement line item 220 (or contract line item) typically covers a specific product, asset, service, or some other item, or any combination thereof. As used herein, a product may be defined as any tangible or intangible item such as, for example, a good, a resource, a service, a class, training, and so on, and an asset is a specific instance of a particular product.

In an embodiment, each agreement line item 220 may be associated with (1) a particular invoice plan that defines various types of billings (e.g., for non-recurring charge (NRC), recurring charge (RC), and use charge) applicable to the agreement line item and (2) any adjustments to the total billed amount for the agreement line item. The invoice plan for each agreement line item may be selected from among a number of predefined invoice plans, or may be a custom invoice plan defined specially for the agreement line item. If multiple line items are included in an agreement, these agreement line items may be associated with the same or different invoice plans. Each agreement line item is further associated with a particular invoicing schedule that defines the timing for the generation of invoices (i.e., when invoices are to be generated for the agreement line item and for how long).

Each agreement line item 220 may also be associated with a particular account to which invoices for the agreement line item are addressed. The different line items in each agreement may be associated with the same or different accounts.

In an embodiment, the automatic invoice generation may be selectively enabled for each agreement line item 220 via an "Auto Invoice" flag 222. This flag 222 may be set (or checked, e.g., by default) to enable automatic generation of invoices for the agreement line item, and may be reset (or unchecked, e.g., manually) to disable the feature.

Invoice engine 115 may be executed to automatically generate invoices for the designated set of one or more agreements 210. Invoice engine 115 would then process each enabled (or set) line item of each agreement, and generate a set 250 of one or more invoice line items for each enabled agreement line item based on its associated invoice plan and invoicing schedule. In an embodiment, each invoice line item covers a particular billing type (e.g., non-recurring charge, recurring charge, or use charge) or other credits/charges for the agreement line item. Invoice engine 115 would ignore each agreement line item for which Auto Invoice flag 222 is not set. Invoice engine 115 then generates an invoice 240 for each "active" account (with at least one invoice line item) by aggregating all invoice line items addressed to the account.

As shown in FIG. 2, any number of line items in any number of agreements may be automatically invoiced to generate any number invoices, each of which may include any number of invoice line items. The automatic and flexible generation of invoice line items from agreement line items can greatly simplify the management of agreements. The invoice engine may be executed continually, periodically, at designated or scheduled times, or in a batch mode to generate invoices as billings become due. The invoice engine may also be executed interactively or via a repeat-request mode to generate invoices at specific times determined by an administrator or an end-user. Various details of the automatic invoice generation are described below.

As noted above, each agreement line item is associated with a particular invoice plan that defines (1) one or more billing types applicable to the agreement line item and any adjustments to the total billed amount, and (2) a plan and/or schedule for each applicable billing type. Table 1 lists various billing types that may be applied to each agreement line item. Fewer, additional, and/or different billing types may also be supported by the system and are within the scope of the invention. The billing types and plans/schedules are described in further detail below.

TABLE 1

| Billing Types/Adjustments | Description |
| --- | --- |
| Non-Recurring Charge (NRC) | a one-time fee for an agreement line item |
| Recurring Charge (RC) | an on-going fee for an agreement line item |
| Use Charge | a fee based on actual usage of a specified asset |
| Milestones | fees based on the completion of agreement deliverables |
| Adjustments | adjustments to the fees |

A non-recurring charge may be defined for each agreement line item. The total amount of non-recurring charge and the start date of NRC billing(s) are typically defined. If multiple NRC payments are to be made, then a particular NRC plan and a particular NRC schedule may be selected for the agreement line item. The NRC plan defines the computation to obtain the amount for each NRC billing, and may be selected from among a number of defined NRC plans. The NRC schedule defines the timing for the NRC billings. Various parameters used to define non-recurring charge are described in further detail below.

A recurring charge may also be defined for each agreement line item. The amount of recurring charge for each RC billing period, the RC billing period, and the start date of the RC billings are typically defined. Adjustments may also be made to the RC billings, e.g., to prorate an RC billing for an invoicing period that is shorter than a complete RC billing period. Various parameters used to define recurring charge are described in further detail below.

A Use charge may also be defined for each agreement line item and may be used to support certain types of agreement such as rental, lease, and usage-based pricing agreements. A number of Use plans may be defined, and a particular Use plan may be selected or specially defined for an agreement line item. Each Use plan defines a particular scheme for computing the Use charge billings. Various parameters for defining Use charge are described in further detail below.

Adjustment may be made to the total billed amount for each agreement line item (in addition to the adjustment for the RC billings). The adjustment may be computed based on a particular adjustment scheme, as described below.

As noted above, each agreement line item is further associated with a particular invoicing schedule that defines when invoices are to be generated for the agreement line item. The invoicing schedule determines when invoices are to be generated for the agreement line item, and may be different from the schedules for the NRC, RC, and Use charge, which affect the billed amounts, as described below. In an embodiment, the invoicing schedule defines (1) a start date and an end date that respectively mark the start and the end of an invoicing time window during which invoices may be generated for the agreement line item, (2) a schedule to be used for generating invoices for the agreement line item, (3) a specific date (e.g., the first day, last day, or $n^{th}$ day of each month) within each invoicing period on which invoices are to be generated, and (4) a "basis" to be used for generating the invoices. The schedule for generating invoices may be periodic (e.g., weekly, monthly, quarterly, bi-annually, annually, and so on) or non-periodic (e.g., on designated dates or whenever invoked). The basis may indicate that invoices are to be generated covering only the current invoicing period, or for the current invoicing period plus a future time period designated by an end-user via an "Advance To" field.

The techniques of the invention may be implemented in various manners and using various user interfaces (e.g., screens). For clarity, a specific implementation of various aspects and embodiments of the invention is described below.

Figure 3:
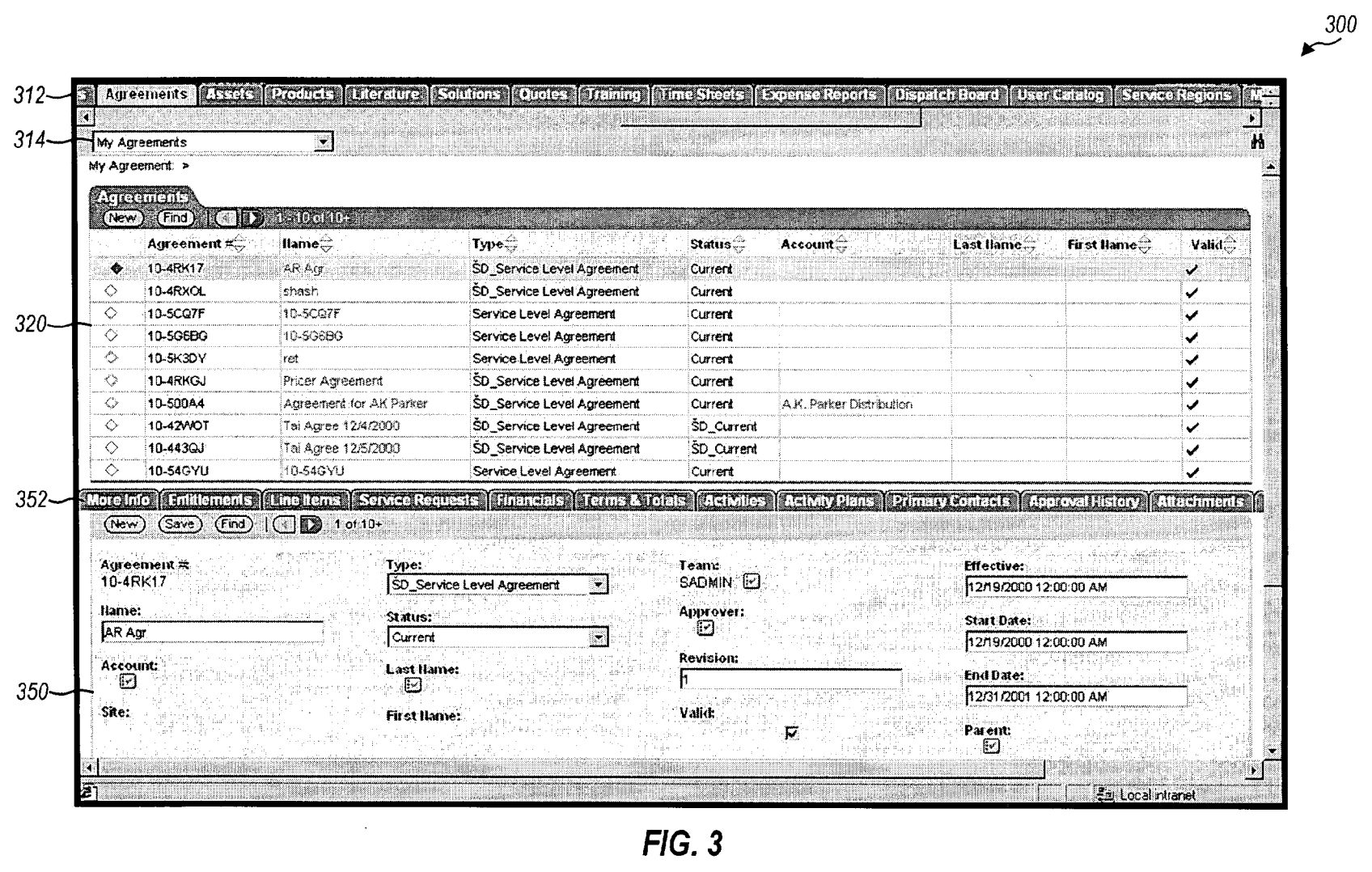

FIG. 3 shows a screen 300 that may be used by an administrator or an end-user to view and edit agreements, in accordance with a specific embodiment of the invention. Screen 300 includes main menu tabs 312 that may be used to invoke various modules, functionality, and features provided by an overall system. In such a design, the contract management system may represent just one of many individual systems included in the overall system. Upon selection of a particular menu tab (e.g., "Agreements"), a list box 314 is provided to allow an administrator or an end-user to select one of a number of possible choices supported by the selected system. In the example shown, the "My Agreements" choice is selected in list box 314.

Screen 300 includes an Agreements list applet 320 that is displayed in response to the selection of the "My Agreements" choice in list box 314. Agreements list applet 320 includes a list table that displays a particular set of agreements, which may be selected via a set of one or more criteria.

For example, the agreements displayed in the list table may include agreements managed by a particular end-user, agreements for a particular account, agreements for a particular product, and so on. The list table includes a number of data rows, with each data row corresponding to a record for one agreement. A particular agreement in the list table may be selected by highlighting (e.g., clicking on) the corresponding data row. The selected agreement may then be displayed with a different color for the list table for ease of viewing.

Screen 300 also includes an Agreement form applet 350 that displays information for the specific agreement selected in Agreements list applet 320. Agreement form applet 350 includes main tabs 352 that may be invoked to obtain various "views" of the selected agreement, with each view providing a different set of information (e.g., a different set of applets) for the selected agreement. In FIG. 3, Agreement form applet 350 shows general information for the selected agreement.

Figure 4A:
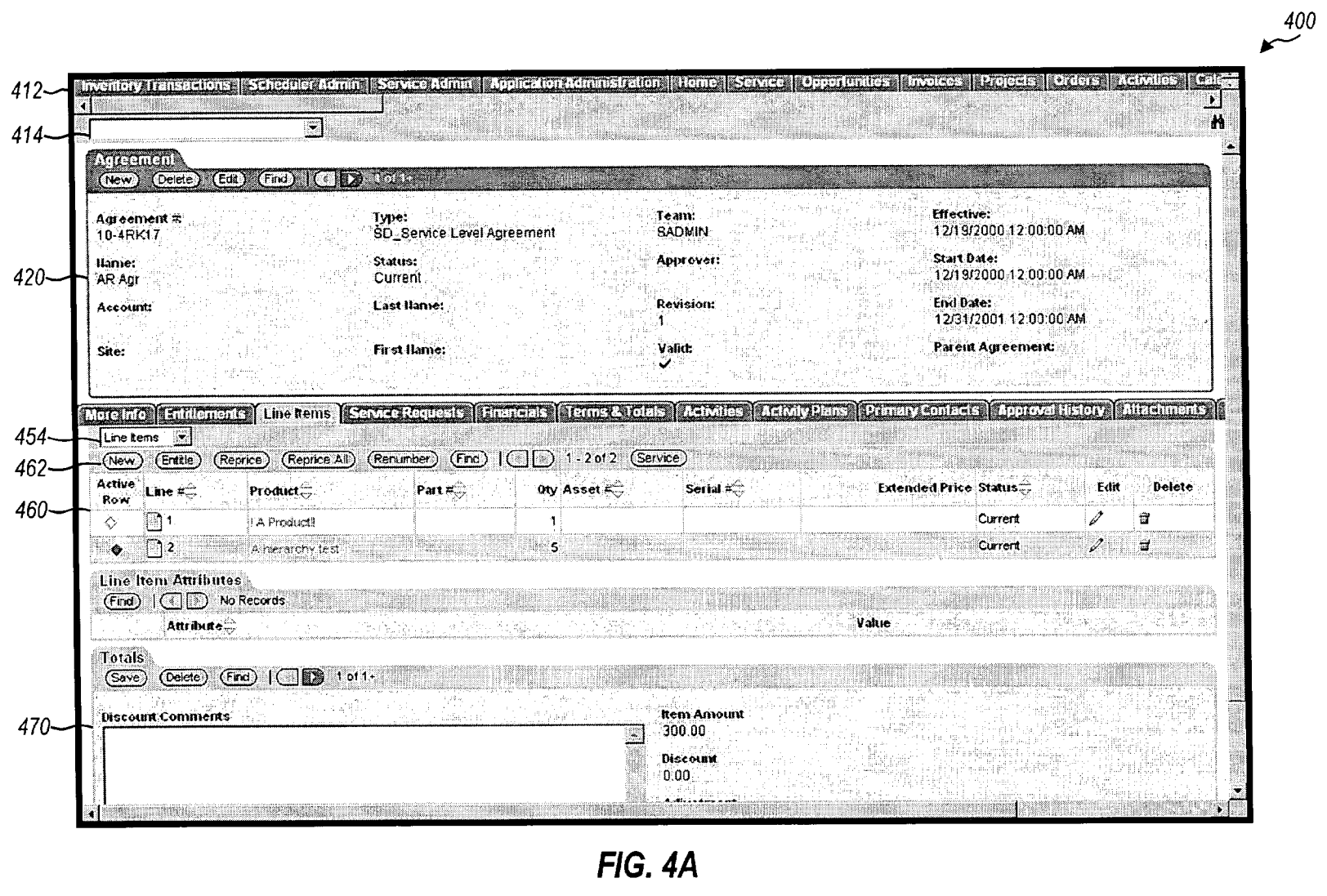

FIG. 4A shows an embodiment of a screen 400 that may be used to view and edit a specific agreement, which may be selected from among those shown in Agreements list applet 320 in FIG. 3. Screen 400 includes an Agreement form applet 420 that displays information for the selected agreement. Screen 400 also includes a Line Items list applet 460 used to display information for the line items in the selected agreement and to enable an end-user to interactively edit the agreement line items. Line Items list applet 460 may be invoked by selecting a "Line Items" choice in a list box 454. Other applets may be displayed by selecting other choices in list box 454, as described below.

Line Items list applet 460 includes a set of buttons 462 used to invoke various functions applicable for the agreement line items. A "New" button may be invoked to add a new line item for the selected agreement. An "Entitle" button may be invoked to instantiate entitlements for all line items and sub-line items listed in Line Items list applet 460. Entitlement instantiation is described in further detail in the aforementioned U.S. patent application Ser. No. 09/967,895. A "Service" button may be invoked to bring up a Service Product pop-up applet that displays a list of possible service products for a selected agreement line item. Upon selecting a particular service product from the list, the fields of the selected agreement line item are automatically filled with the information for the selected service product. A "Reprice" button may be used to determine the pricing for the selected agreement line item based on a defined price list and its related pricing model. A "Reprice All" button may be used to determine the pricing for all agreement line items based on the defined price lists and their related pricing models. The Reprice and Reprice All buttons may be advantageously used, for example, to provide quotes for agreements.

Line Items list applet 460 displays all line items for the selected agreement using a list table. Each data row in the list table corresponds to a record for one agreement line item. The list table includes columns for a number of fields of the agreement line items. Table 2 lists various fields that may be defined for agreement line items and the corresponding descriptions. Fewer, additional, and/or different fields may also be defined and are within the scope of the invention.

TABLE 2

| Field | Description |
| --- | --- |
| Line # | the number assigned to the agreement line item, which may be renumbered by invoking a "Renumber" button |
| Product | the product covered by the agreement line item |
| Part # | the part/item number of the given product |

TABLE 2-continued

| Field | Description |
| --- | --- |
| Qty | the quantity covered by the agreement line item |
| Asset # | the specific asset covered by the agreement line item; this asset may be an instantiation of a different product than the one identified in the Product field (e.g., agreement line item covers product "X" but asset is product "Y") |
| Serial # | a number related to or identical to the asset number, which is typically used for asset identification |
| Asset Description | text description of the covered asset, which may be automatically generated based on the Asset # |
| Extended Price | the unit price for the product or asset covered by the agreement line item; may be pre-paid, partially paid, or fully amortized over a particular time period |
| Non-Recurring Charge (NRC) | a one-time fee for the line item |
| Recurring Charge (RC) | an ongoing fee for the line item |
| Use Plan | a Use plan may be selected that is valid for either the product or the asset in the agreement line item |
| Usage Asset # | the asset to be used for calculating the Use fee |
| Account | the account to which invoices for the agreement line item is addressed; default is a "Bill To" account for the agreement |
| Status | the current status of the agreement line item |
| Canceled | effective date/time of cancellation; no invoices are generated after this date |
| Cancel Reason | text describing the reason for the cancellation |
| Start Date | start date for entitlements created automatically for the agreement line item |
| End Date | end date for entitlements for the agreement line item |
| Edit | a button that may be invoked to go to a Line Item Edit form applet |

Not all fields in Table 2 are shown in FIG. 4A. Horizontal cursors may be provided above the list table to allow for scrolling across the list table to display other fields.

Screen 400 also includes a Totals form applet 470 that may be used to display pricing information for one or more selected agreement line items. Price adjustments and comments may also be entered in Totals form applet 470.

Figure 4B:
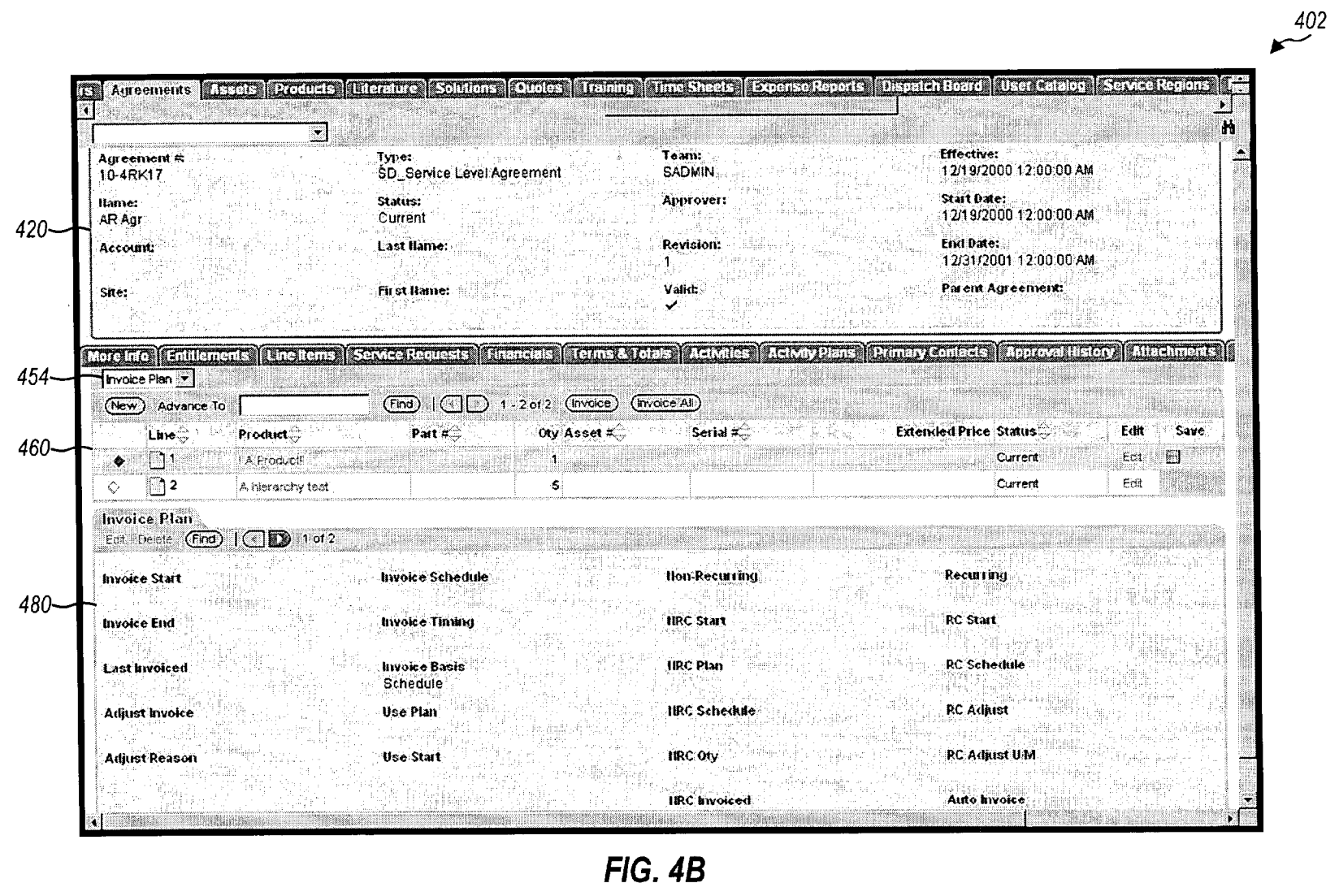

FIG. 4B shows an embodiment of a screen 402 that may be used to view and edit invoice plan information for a selected agreement line item. Screen 402 includes Agreement applet 420, Line Item list applet 460, and an Invoice Plan form applet 480. Invoice Plan form applet 480 may be invoked by selecting an "Invoice Plan" choice in list box 454. Form applet 480 may be used to provide information for certain fields for the selected agreement line item in a more intelligible manner than with the list table in Line Items list applet 460. Access to invoice plan information may be controlled by granting limited access rights to Invoice Plan form applet 480 (e.g., to an administrator but not to end-users).

In the embodiment shown in FIG. 4B, Line Item list applet 460 includes an "Invoice" button, an "Invoice All" button, and an "Advance To" data box, which are displayed for the "Invoice Plan" selection in list box 454. The Invoice button may be invoked to generate an invoice for the selected agreement line item. The Invoice All button may be invoked to generate an invoice for all agreement line items of the selected agreement. The Advance To data box may be used to enter an advanced date, in which case invoices may be generated to cover up to the advanced date.

Invoice Plan form applet 480 includes various fields used to define a specific invoice plan for the selected agreement line item. Table 3 shows various fields that may be included in Invoice Plan form applet 480 and the corresponding descriptions. Fewer, additional, and/or different fields may also be provided and are within the scope of the invention.

TABLE 3

| Field | Description |
| --- | --- |
| Invoice Start | start date of the invoice plan |
| Invoice End | end date of the invoice plan |
| Invoice Schedule | time period when invoices are to be generated (e.g., monthly), which is also referred to as the invoicing period |
| Invoice Timing | specific day/date in each invoicing period when invoices are to be generated (e.g., 1st or last of each month) |
| Invoice Type | the invoice type, which may be rent, lease, finance, purchase, service, fee-per-use, or trade-in |
| Invoice Status | the default status for generated invoices, which may be active, quoted, cancelled, pending, current, and so on |
| Invoice Basis | Schedule = generate invoice for the current invoicing period<br>Advance = generate invoice for the current invoicing period plus a future time period designated by the date in the "Advance To" field |
| Last Invoiced | date/time of the last invoice generated for the agreement line item; this date is used to determine the RC and Use charge billed amounts; default is RC/Use Start |
| Advance To | future date/time that invoices will be generated up until |
| Use Start | start date for Use charge billings; cannot be earlier than Invoice Start date or later than Invoice End date; default is Invoice Start date |
| Use Plan | a specific plan for determining Use charge billed amounts; Use plans may be defined via a Service Admin screen described below |
| Non-Recurring | total NRC amount due for the agreement line item |
| NRC Start | start date for NRC billings; cannot be earlier than Invoice Start date or later than Invoice End date; default is Invoice Start date |
| NRC Schedule | a schedule defining the frequency of NRC billings; can be different than the Invoice Schedule and the RC Schedule |
| NRC Plan | a specific plan for determining NRC billed amounts; default is total NRC amount divided equally by NRC Qty if no NRC plan is specified;NRC plans may be defined via a Service Adminscreen described below |
| NRC Qty | number of NRC billings |
| Recurring | RC billed amount for each RC billing period; an agreement line item may be invoiced even though the Recurring field is blank |
| RC Start | start date for RC billings; cannot be earlier than Invoice Start date or later than Invoice End date; default is Invoice Start date |
| RC Schedule | a schedule defining the frequency of RC billings; can be different than the Invoice Schedule and the NRC Schedule |
| RC Adjust | adjustments to be made in computing the RC amount owed; adjustments may be made to prorate for a shortened RC billing period |
| RC Adjust U/M | specifies the level of granularity for billing any fractions of time (e.g., hour, day, week, month) for RC billings |
| Adjust | manual adjustment; entered (positive or negative) |
| Invoice | amount is swept into the next invoice; field is cleared after each use |
| Adjust Reason | text describing reason for adjustment; field is cleared after use |
| Cancel | effective date/time of cancellation of the agreement line item |
| Cancel Reason | text describing the reason for the cancellation |
| Auto-Invoice | flag to enable automatic generation of invoices for the agreement line item (default = set) |

Figure 5A:
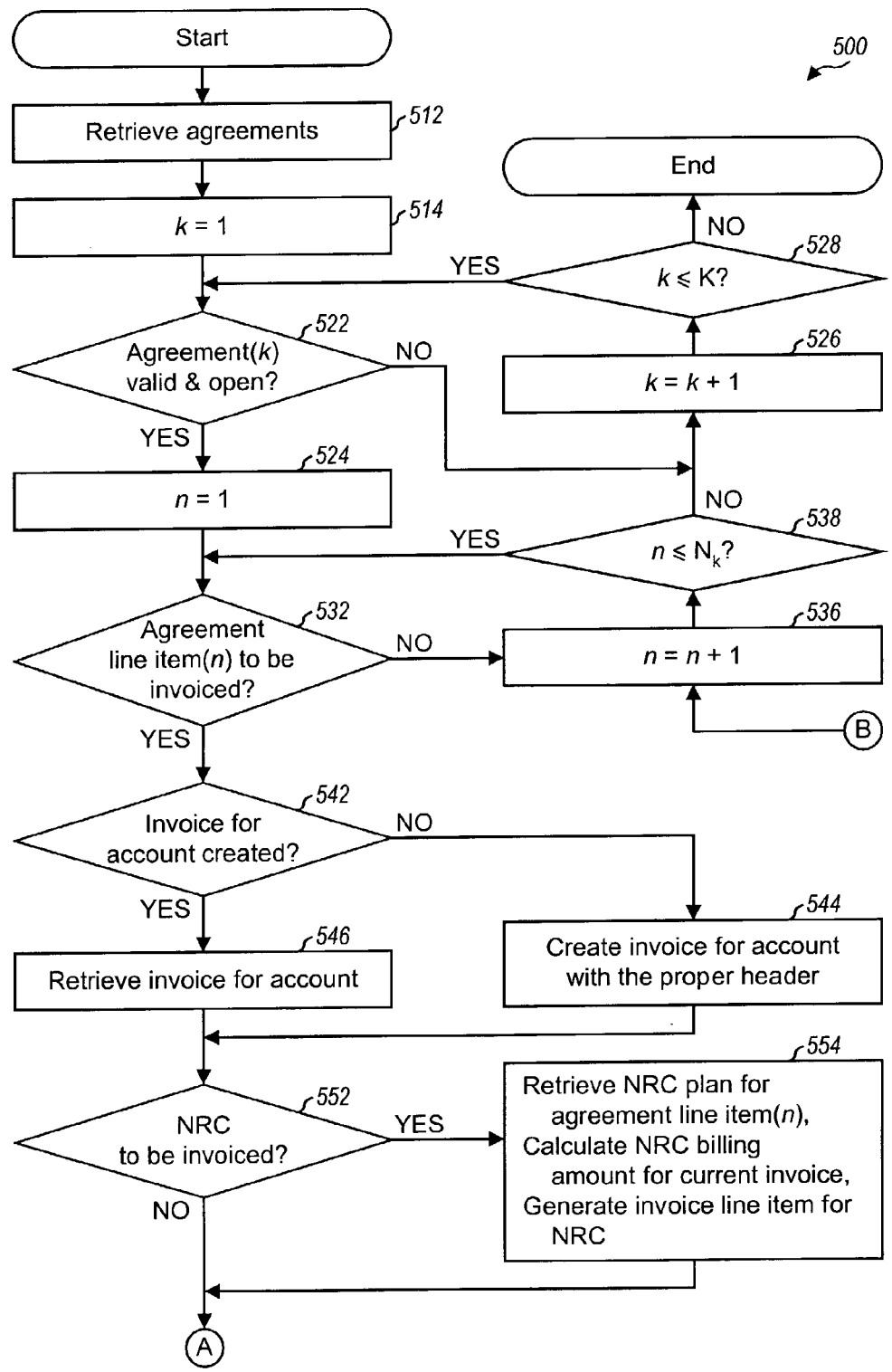
FIG. 5 is a flow diagram of an embodiment of a process to automatically generate invoices.
Figure 5B:
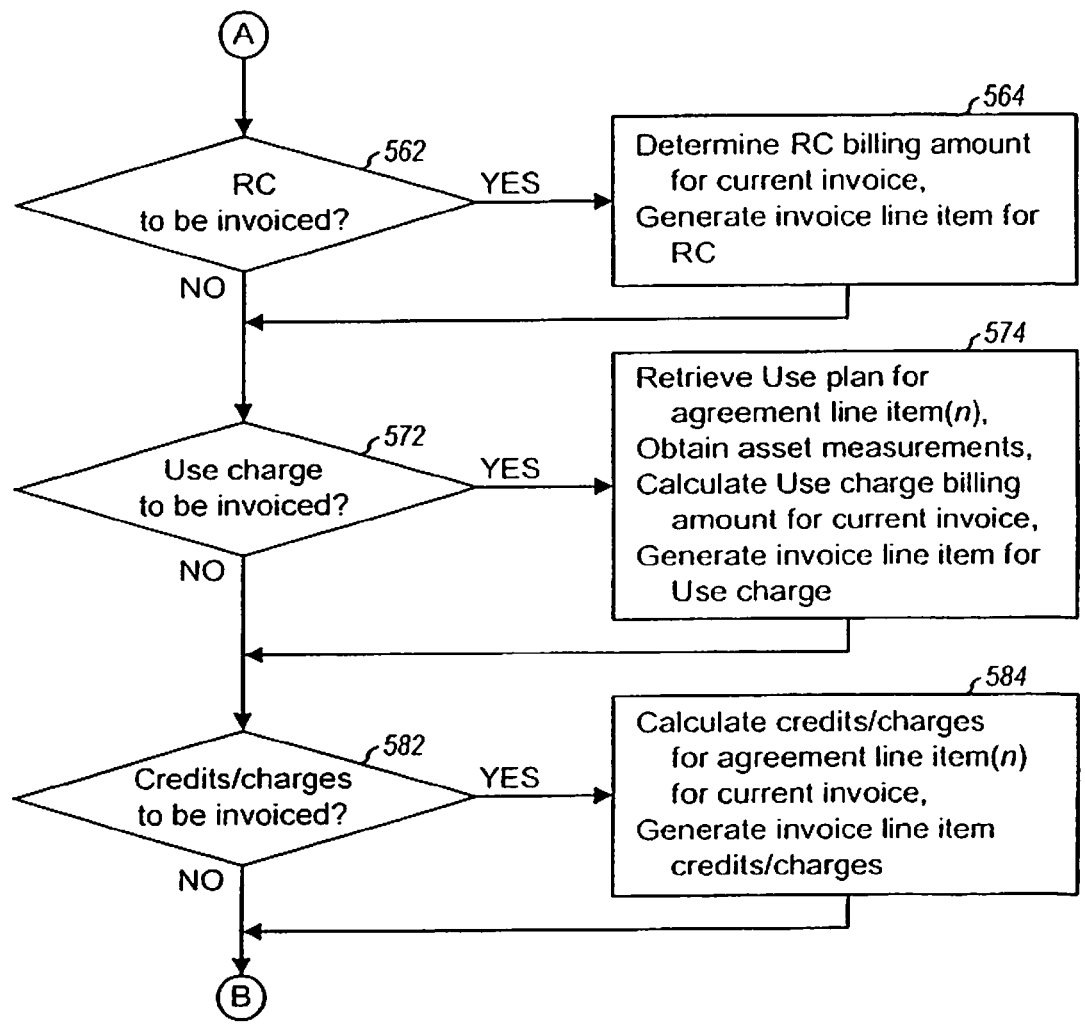

FIG. 5 is a flow diagram of a process 500 to automatically generate invoices, in accordance with an embodiment of the invention. Initially, a set of one or more (K) agreements is identified for processing and retrieved, at step 512. These agreements may be selected based on any set of one or more criteria (e.g., all agreements, agreements for a particular account, agreements for a particular product, and so on). The selected agreements are then processed, one agreement at a time by initially setting k=1 at step 514.

At step 522, the current status of agreement k is determined. This may include, for example, checking whether or not the agreement is Valid and whether or not the status of the agreement is Open. If the agreement is both Valid and Open, then the line items in the agreement are processed, one line item at a time by initially setting n=1 at step 524.

At step 532, a determination is made whether or not agreement line item(n) is to be invoiced. In an embodiment, an agreement line item may be automatically invoiced if it is billable, not canceled, and further enabled for auto invoicing by setting the Auto Invoice flag. If an agreement line item is canceled on a given date/time, then the line item may be invoiced up to the date/time of cancellation (e.g., the RC billed amount may be prorated). Different and/or additional criteria may also be used to determine whether or not an agreement line item is to be automatically invoiced.

If the agreement line item is to be invoiced, then a determination is next made whether or not an invoice has already been created for the account to which the current agreement line item is addressed, at step 542. If an invoice for this account has not been created for the current invoicing period, then a new invoice is created for this account with the proper invoice header, at step 544. Otherwise, the invoice already created for the account for the current invoicing period is retrieved, at step 546.

A determination is then made whether or not non-recurring charge is to be invoiced for the agreement line item, at step 552. This determination may be made, for example, by obtaining the total NRC amount to be invoiced (from the Non-Recurring field) and determining whether or not this amount is greater than zero. If NRC is not to be invoiced (e.g., the total NRC amount is zero, or all NRC billings have already been invoiced), then the process proceeds to step 562. Otherwise, non-recurring charge is invoiced for the agreement line item, at step 554. This may be achieved by retrieving the NRC plan for the agreement line item and calculating the NRC billed amount for the current invoice. A line item is then generated in the invoice for the non-recurring charge. The process then proceeds to step 562.

At step 562, a determination is made whether or not recurring charge is to be invoiced for the agreement line item. This determination may be made, for example, by checking the value for the Recurring field in the agreement line item. If RC is not to be invoiced (e.g., the Recurring field is zero, or if no RC billing is due for the current invoicing period), then the process proceeds to step 572. Otherwise, recurring charge is invoiced for the agreement line item, at step 564. This may be achieved by determining the RC billed amount for the current invoice (e.g., from the Recurring field). The RC billed amount may then be adjusted based on any adjustment specified for the agreement line item (e.g., in the RC Adjust and RC Adjust U/M fields). A line item is then generated in the invoice for the recurring charge. The process then proceeds to step 572.

At step 572, a determination is made whether or not Use charge is to be invoiced for the agreement line item. This determination may be made, for example, by checking whether or not a Use plan has been specified for the Use Plan field in the agreement line item. If Use charge is not to be invoiced (e.g., no Use plan specified, or if no Use charge billing is due for the current invoicing period), then the process proceeds to step 582. Otherwise, Use charge is invoiced for the agreement line item, at step 574. This may be achieved by retrieving the Use plan for the agreement line item, retrieving measurements for each asset covered by the specified Use plan, and calculating the Use charge billed amount for the current invoice based on the Use plan and the asset measurements. A line item is then generated in the invoice for the Use charge. The process then proceeds to step 582.

At step 582, a determination is made whether or not credits and/or other charges are to be invoiced for the agreement line item. This determination may be made as described below (e.g., by checking the "Adjust Invoice" field). If credits/charges are not to be invoiced, then the process proceeds to step 536. Otherwise, credits/charges are invoiced for the agreement line item, at step 584. A line item is then generated in the invoice for the credits/charges. The process then proceeds to step 536.

At step 536, the next agreement line item is processed by incrementing n. If any line item is still left to be processed (i.e., $n \leq N_k$) for the current agreement k, as determined in step 538, then the next agreement line item is processed by returning to step 532. Otherwise, if all line items for agreement k have been processed, of if agreement k is not to be processed (e.g., not billable or is canceled) as determined in step 522, then the next agreement is considered for processing by incrementing k, at step 526. If any agreement is still left to be processed (i.e., $k \leq K$), as determined in step 528, then the next agreement is processed by returning to step 522. Otherwise, if all agreements have been processed, then process 500 terminates.

As shown in FIG. 5, the invoice engine considers the information for each agreement in the set and, if appropriate, the information for each line item in the agreement to automatically generate invoices. For each agreement line item, the invoice engine may generate up to four invoice line items for NRC, RC, Use charge, and credits/charges, depending on the structure of the agreement. Each of these four different types of charge is described in further detail below.

The NRC billed amount for a particular agreement line item may be calculated based on an NRC plan selected for that line item. Various NRC plans may be defined by an administrator, and a particular NRC plan may be selected or specially defined for an agreement line item.

Figure 6A:
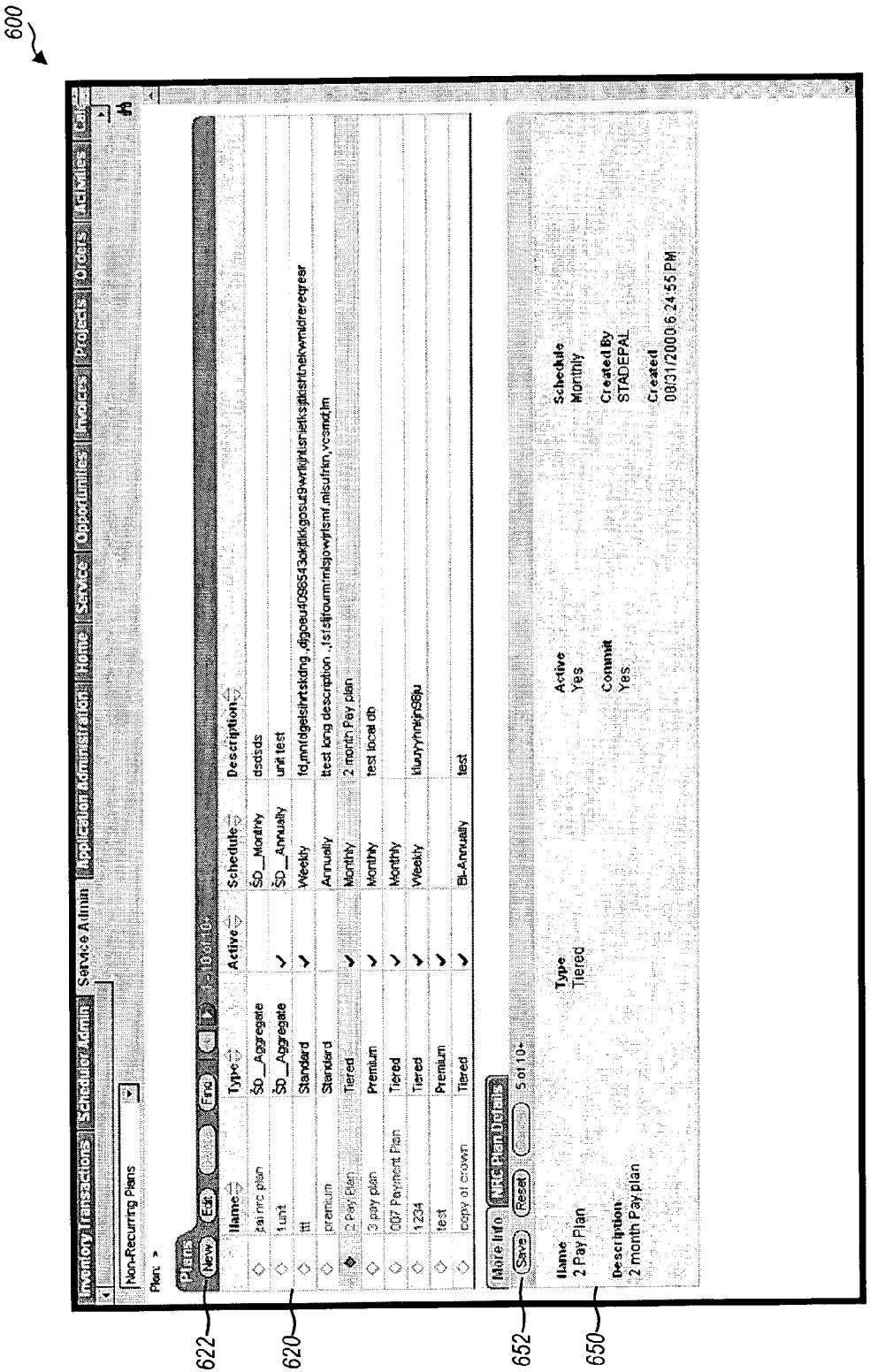

FIG. 6A shows an embodiment of a screen 600 that may be used to view and edit NRC plans. Screen 600 shows an NRC Plans list applet 620 that displays previously defined NRC plans in a list table. Each data row in the list table corresponds to a record for one NRC plan. In the embodiment shown, the list table includes columns for the following fields: the name of the NRC plan ("Name"), the NRC plan type ("Type"), the status of the NRC plan ("Active"), the schedule for NRC billings ("Schedule"), a flag to turn the NRC plan into read-only ("Commit"), and a description of the NRC plan ("Description"). A particular NRC plan may be selected for editing or deletion, or a new NRC plan may be created by invoking the proper button in button set 622. Screen 600 further includes an NRC Plan form applet 650 that may be used to edit an existing NRC plan or to enter information for a new NRC plan.

FIG. 6B shows an embodiment of a screen 602 that may be used to view and edit a particular NRC plan, which may be selected from among the NRC plans displayed in NRC Plans list applet 620 in FIG. 6A. Screen 602 includes NRC Plan form applet 650 and an NRC Plan Details list applet 660 that displays the details of the selected NRC plan and allows an administrator to define the plan.

In the embodiment shown, NRC Plan Details list applet 660 displays the selected NRC plan using a list table that includes a number of records, one record for each billing called out by the NRC plan. The list table further includes columns for the following fields: a record number ("Number"), a percentage of the total NRC amount that is due for the current NRC billing ("NRC %"), an additional percentage of the total NRC amount that is due for the current NRC billing, which may be used to account for finance charges and so on ("Additional %"), an additional charge amount for the current NRC billing ("Additional Charge"), a description for the charge ("Charge Description"), and comments ("Comments"). One last record may be displayed in NRC Plan Details list applet 660 (not shown in FIG. 6B) to include the total of all records (i.e., each column in the last record, if appropriate, would include the summation of the values in the same column for all other records).

The RC billed amount for an agreement line item is determined by the value in the Recurring field. The timing of the RC billings is based on a schedule in the RC Schedule field. If the RC schedule is not the same as the Invoice schedule, or if the current invoicing period only covers a portion of the RC billing period, then the RC billing may be prorated for the current invoicing period. The values in the RC Adjust and RC Adjust U/M fields determine the manner in which the RC billing is prorated. RC billings may also be used for fees, renewals, and so on. RC billings may also be generated based on RC plans.

A Use plan may be selected for an agreement line item and used to calculate a Use charge billed amount for the agreement line item based on usage of one or more assets specified by the Use plan. Various Use plans may be defined by an administrator, and a particular Use plan may be selected or specially defined for an agreement line item.

Figure 7A:
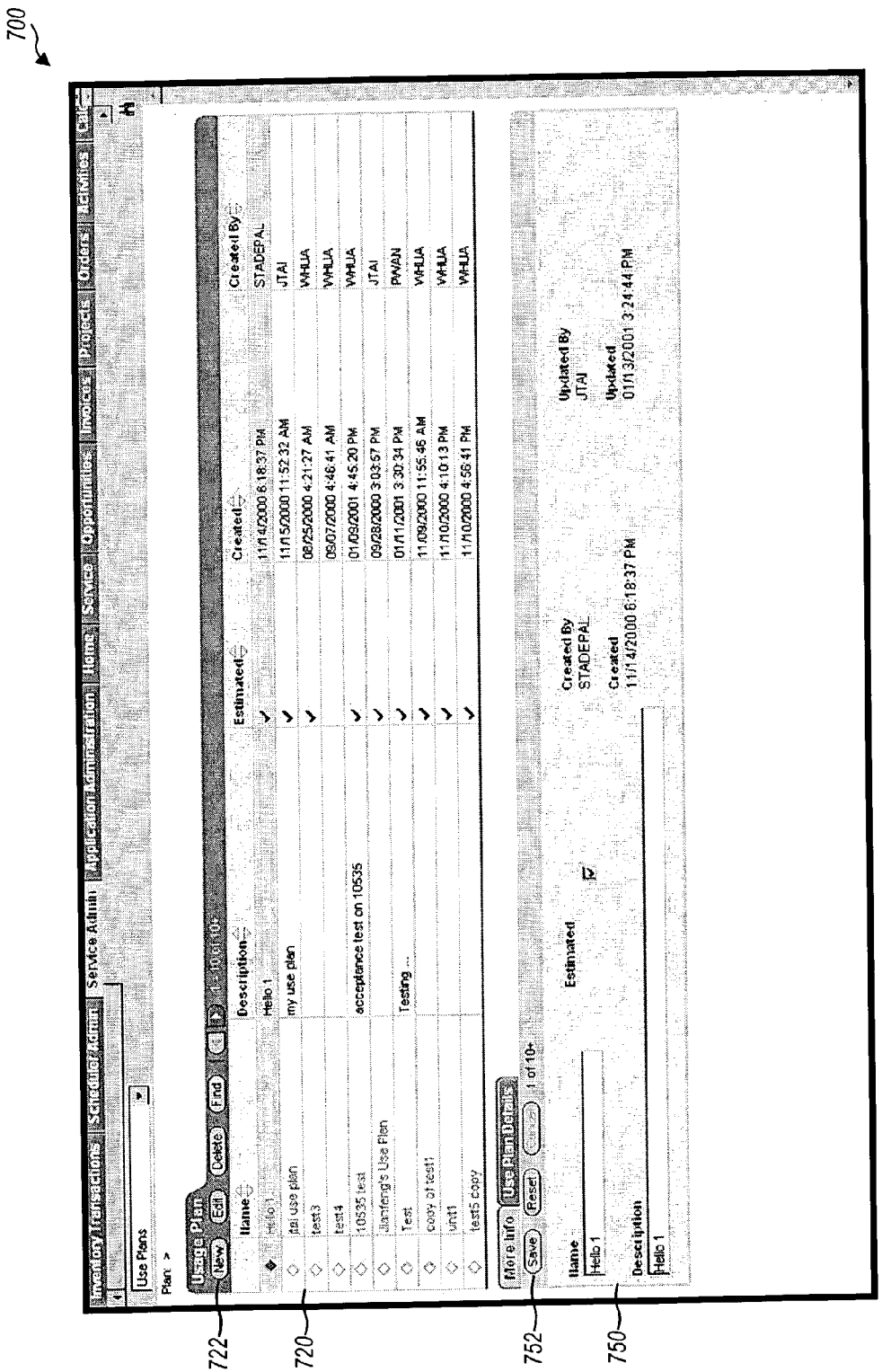
FIGS. 7A and 7B show an embodiment of screens that may be used to view and edit Use plans.

FIG. 7A shows an embodiment of a screen 700 that may be used to view and edit Use plans. Screen 700 shows a Use Plans list applet 720 that displays previously defined Use plans using a list table. Each data row in the list table corresponds to a record for one Use plan. In the embodiment shown, the list table includes columns for the following fields: the name of the Use plan ("Name"), a description of the Use plan ("Description"), a flag to indicate the status of the Use plan ("Active"), and a flag to indicate whether or not usage may be estimated for all or a portion of the current invoicing period if measurement readings are not available ("Estimated"). A particular Use plan may be selected for editing or deletion, or a new Use plan may be created by invoking the proper button in a button set 722. Screen 700 further includes a Use Plan form applet 750 that may be used to edit an existing Use plan or to enter information for a new Use plan.

Figure 7B:
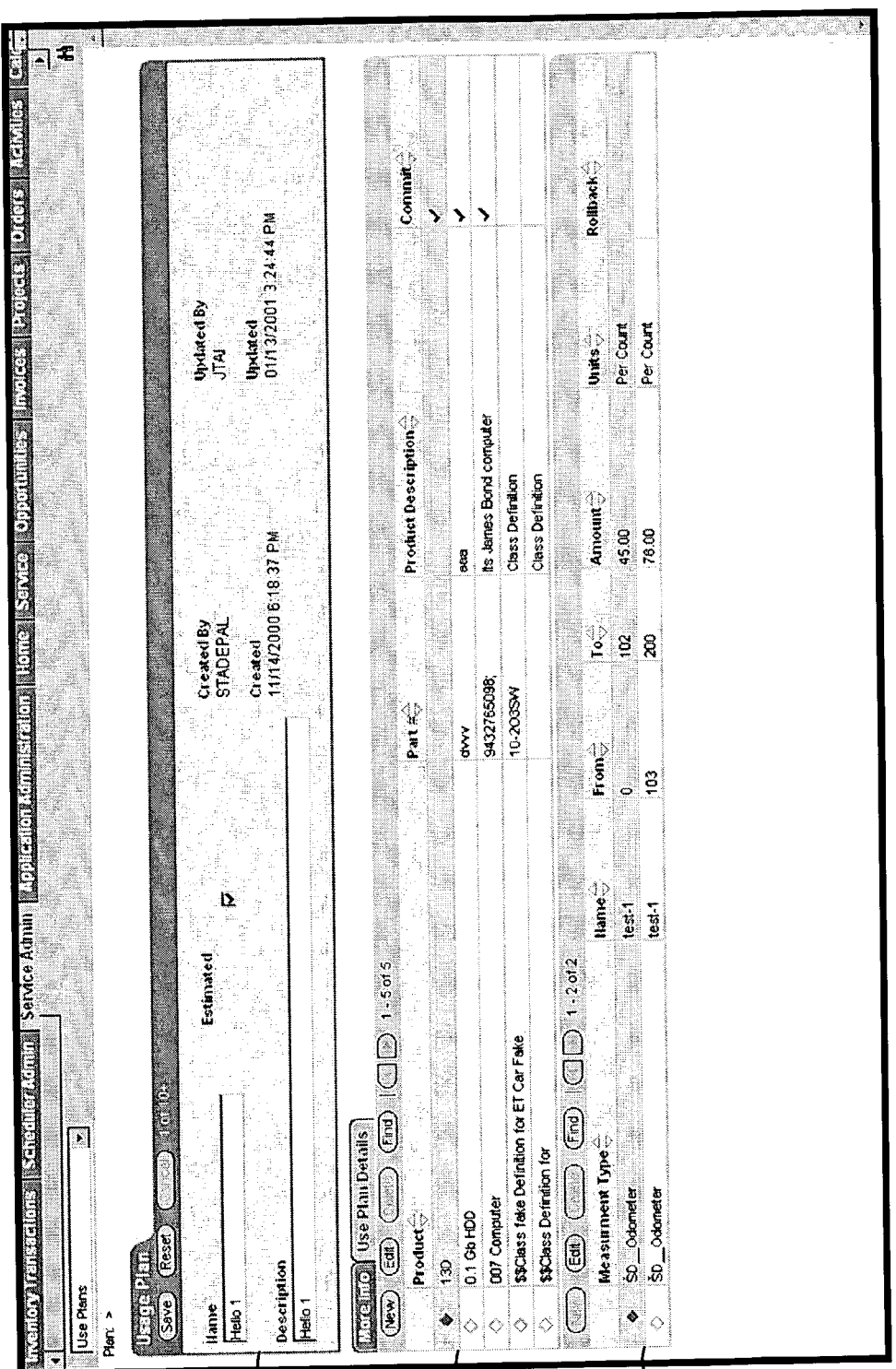

FIG. 7B shows an embodiment of a screen 702 that may be used to view and edit a particular Use plan, which may be selected from among the Use plans displayed in Use Plans list applet 720 in FIG. 7A. Screen 702 includes Use Plan form applet 750 and a Use Plan Details list applet 760 that displays the details of the selected Use plan and allows an administrator to define the Use plan. In the embodiment shown, the selected Use plan is described using a list table. Each data row in the list table corresponds to a record for one product that is covered by, and may utilize, the Use plan. Any number of products may thus be covered by a particular Use plan. The list table further includes columns for the following fields: the product covered by the Use plan ("Product"), the number of the covered product ("Part #"), a description field for the covered product ("Description"), and a flag to turn the Use plan into read-only ("Commit").

Screen 700 further shows a Pricing list applet 770 that displays Use pricing details for a particular product in the selected Use plan. Pricing list applet 770 allows an administrator to enter information for the Use pricing. Each product covered by the Use plan may be associated with a respective Use pricing used to determine the Use charge billed amount for an asset of that product type. Use pricing is typically defined for each product covered by the Use plan, and different Use pricing may be defined for different products covered by the Use plan.

Various Use pricing schemes are also supported, and each product may be associated with a particular Use pricing scheme. In the embodiment shown, the Use pricing for a selected product is described using a list table that includes one or more records, one record for each measurement range.

In one scheme, the Use pricing is "tiered" such that different amounts may be charged for different incremental quantities. As an example for a copier, the first 1000 copies may be charged at $0.03/copy, the next 1500 copies may be charged at $0.025/copy, the next 5000 copies may be charged at $0.022/copy, and anything over 5000 copies may be charged at $0.02/copy. The charge for 2400 copies would then be calculated as $65.00 (i.e., the first 1000 copies at $0.03/copy=$30.00, and the next 1400 copies at $0.025/copy=$35.00).

In another scheme, the Use pricing is "aggregated" such that different amounts may be charged for different quantity levels. As an example for the copier, total copies/month of less than 1000 may be charged at $0.03/copy, total copies/month of at least 1000 but less than 2000 may be charged at $0.026/copy, total copies/month of at least 2000 but less than 5000 may be charged at $0.023/copy, and total copies/month of at least 5000 may be charged at $0.02/copy. The charge for 2400 copies would then be calculated as $55.20 (i.e., 2400 copies at $0.023/copy).

In yet another scheme, the Use pricing may be tiered and aggregated. As an example for the copier, a flat RC rate of $100/month may be charged for up to 1000 copies, the next 1000 copies may be charged at $0.02/copy, the next 3000 copies may be charged at $0.01/copy, and each copy over 1000 may be charged at $0.01/copy if the total copies/month is greater than 5000. The charge for 2400 copies would then be calculated as $124.00 (i.e., the $100 monthly fee plus 1000 copies at $0.02/copy and 400 copies at $0.01/copy).

As indicated in FIG. 7B, for each product in Use Plan Details list applet 760, a respective set of one or more pricing records may be defined for the product and displayed in Pricing list applet 770. For each pricing record, the following fields may be defined: (1) the name and type of the measurement to be used to calculate the Use charge billed amount ("Measurement Type"), (2) an applicable quantity range over which the record is valid (the range is determined by the values in the "From" and "To" fields), (3) a unit price to be charged ("Amount"), (4) the unit used to compute the total amount for that record ("Units"), and (5) a "Rollback" flag to indicate whether the value in the Amount field of this record should be used for all previous ranges of quantity if the usage falls within the range specified for the record (this feature may be used to support incentive pricing). Various types of unit may be defined such as quantity (or count), time (e.g., days, hours, minutes), and so on. A "Counter Type" field may be provided to identify whether the measurement readings are incremental or absolute.

The Use pricing may define multiple measurements for a given product in the same Use plan (e.g., if the product has more than one measurement that can be covered by the Use plan). The Use pricing may also be defined to cover rebates, discounts, and other adjustments, which may be based on usage levels.

The Use charge billed amount for an agreement line item is determined based on the Use plan selected for the agreement line item, each asset in the agreement line item covered by the Use plan, and the reading for each measurement of each covered asset. The Use plan may cover multiple products, and the specific Use pricing to be used for each covered asset in the agreement line item is the one for the product of which the asset a specific instance. For example, if the Use plan includes Use pricing for a printer, a hard disk, and a computer, then the Use pricing for the printer is used for a printer asset.

To determine the Use charge billed amount, the use quantity is first determined. This may be achieved by first determining the reading on the last invoice for the asset (or if no prior invoice, then the reading that is nearest to the value of the "Use Start" field). The last reading for the asset closest to the "Invoice Timing" date is next determined. The use quantity is then the difference between these two readings. If no reading is available for any given time period, then the usage during the time period may be estimated and used in place of an actual reading to compute an estimated Use charge billed amount. The estimated usage may be an average or estimated reading, which may be determined from $N_R$ prior readings.

Each reading for a measurement corresponds to a usage amount for the asset, and the sum of all readings covering the current invoicing period may be invoiced. The aggregate reading for each measurement may then be used to determine the Use charge billed amount for this measurement. Depending on the Use pricing defined for the measurement, one record or multiple records in Pricing list applet 770 may be consulted to determine the Use charge billed amount, as shown by the above examples for the copier.

An invoice line item is generated for credits/charges if the "Adjust Invoice" field for an agreement line item is a non-zero value. The invoice engine transfers the value in the "Adjust Invoice" field to the current invoice, along with the reason entered in the "Adjust Reason" field. Both fields for the agreement line item are then cleared after these entries are included in the invoice.

Figure 8:
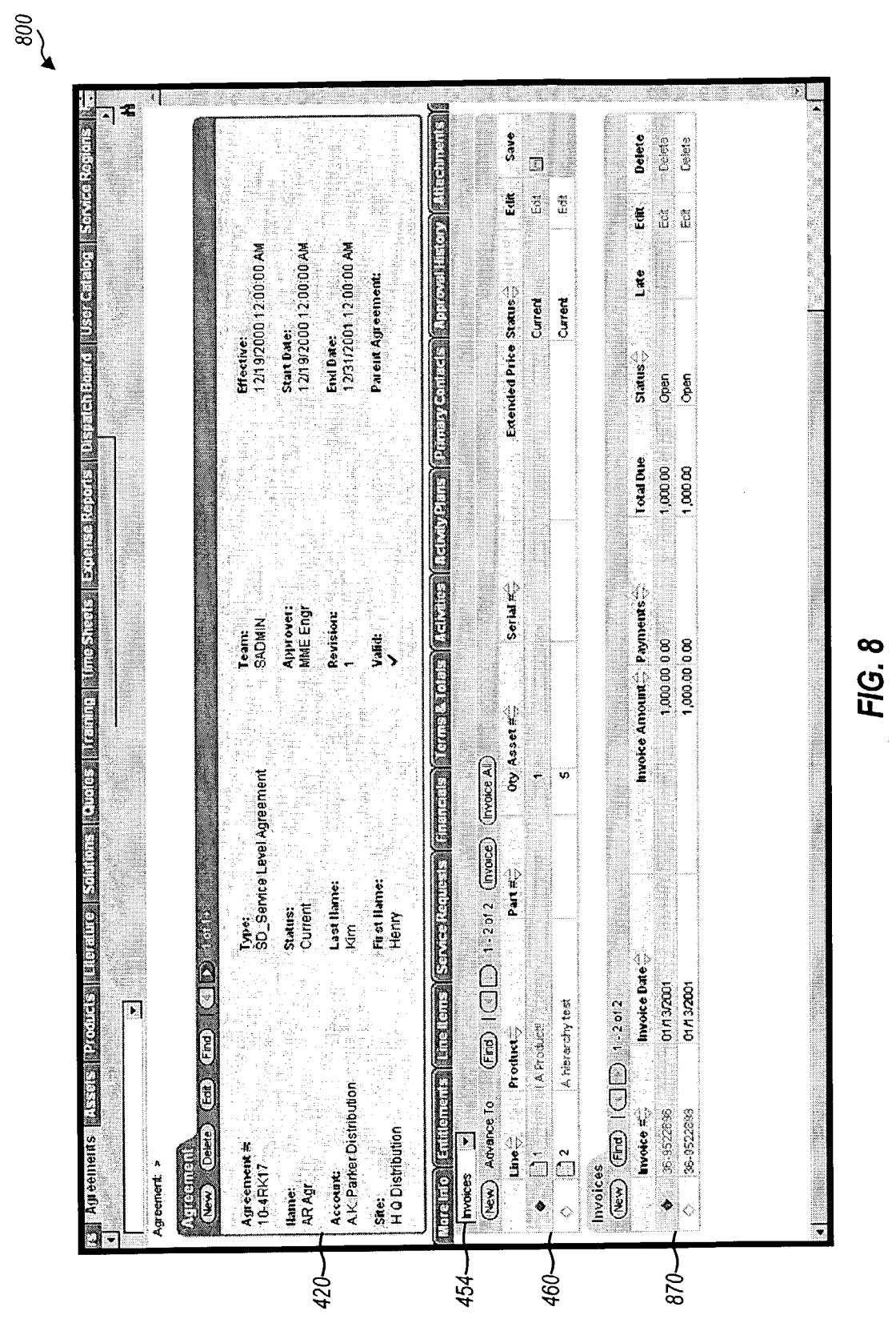

FIG. 8 shows an embodiment of a screen 800 that may be used to display invoices automatically generated for an agreement and to enable an end-user to interactively generate an invoice for one or more selected agreement line items. Screen 800 includes Agreement form applet 420, Line Items list applet 460, and an Invoices list applet 870 that may be invoked by selecting an "Invoices" choice in list box 454. Agreement form applet 420 and Line Items list applet 460 are described above in FIG. 4B.

Invoices list applet 870 displays the invoice line items for the selected agreement using a list table. Each data row in the list table corresponds to a record for one invoice line item. The list table includes columns for a number of fields of the invoice line items. Table 4 lists various fields that may be defined for the invoice and the corresponding descriptions.

TABLE 4

| Field | Description |
| --- | --- |
| Invoice # | a number assigned to the invoice |
| Invoice Date | the date the invoice was generated |
| Invoice Amount | total amount due for the invoice |
| Payments | total payment received for the invoice |
| Due Amount | amount still due for the invoice by the due date |
| Status | status of the invoice (e.g., "Open" or "Closed") |
| Late | indicate whether payment is late |
| Agreement ID | ID of the agreement from which the invoice was generated |
| Line item ID | ID of the agreement line item from which the invoice was generated |
| Product | the product description copied from the agreement line item |
| Payment Terms | price lists and payment terms (may be copied from the agreement) |
| Bill To | contact to which the invoice is addressed (may be copied from the agreement) |

An end-user may automatically create invoices and may further manually add, delete, or modify the invoice records displayed in Invoices list applet 870. In an embodiment, the "Invoice #" field in Invoices list applet 870 may be used to ("drill down") invoke the Invoice form applet, which may be used to view and edit details of the selected invoice line item.

Figure 9:
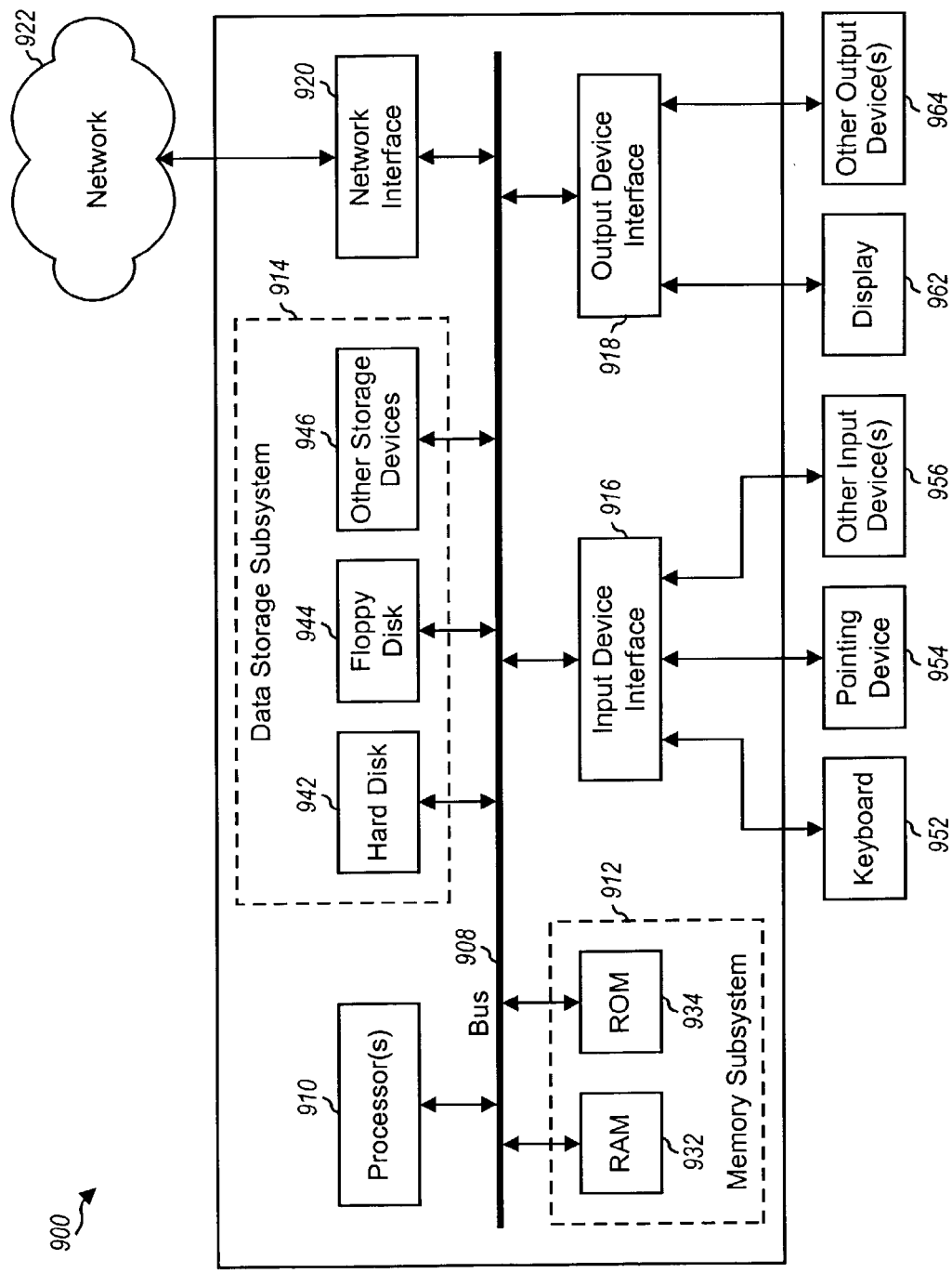
FIG. 9 is a block diagram of a computer system that may be used to implement the host server and client computers in FIG. 1.

FIG. 9 is a block diagram of an embodiment of a computer system 900 that may be used to implement the host server and client computers in FIG. 1. As shown in FIG. 9, system 900 includes a bus 908 that interconnects major subsystems such as one or more processors 910, a memory subsystem 912, a data storage subsystem 914, an input device interface 916, an output device interface 918, and a network interface 920.

Bus 908 provides a means for allowing various components and subsystems of system 900 to communicate with each other. Many of the subsystems and components of system 900 need not be at the same physical location but may be distributed at various locations throughout a communication network. Although bus 908 is shown in FIG. 9 as a single bus, alternate designs for bus 908 may include multiple busses.

Processor(s) 910 perform many of the processing functions for system 900 and communicate with a number of peripheral devices via bus 908. Memory subsystem 912 and data storage subsystem 914 store the program codes and data that implement various aspects of the invention and further provide the functionality of system 900. These program codes and data are then provided to memory subsystem 912 and the codes are executed by processor(s) 910. In a distributed environment, the program codes and data may be stored on a number of computer systems and used by the processors of these systems.

Memory subsystem 912 typically includes a number of memories including a random access memory (RAM) 932 and a read only memory (ROM) 934. RAM 932 is typically used to store codes and data during program execution and ROM 934 is typically used to store fixed codes and data.

Data storage subsystem 914 provides persistent (non-volatile) storage for program codes and data, and may include a hard disk drive 942, a floppy disk drive 944, and other storage devices 946 such as a compact digital read only memory (CD-ROM) drive, an optical drive, and removable media cartridge disk drive. Each of the storage devices may be associated with removable media (e.g., floppy disks, CD-ROMs, cartridges). One or more of the storage devices may be located at remote locations and coupled to system 900 via communication network 922.

Input device interface 916 provides interface with various input devices such as a keyboard 952, a pointing device 954 (e.g., a mouse, a trackball, a touch pad, a graphics tablet, a scanner, or a touch screen), and other input device(s) 956. In general, the term "input device" is intended to include all possible types of devices and ways to input information into system 900.

Output device interface 918 provides an interface with various output devices such as a display 962 and other output device(s) 964. Display 962 may be a cathode ray tube (CRT), a flat-panel device such as a liquid crystal display (LCD), or some other visual devices. In general, the term "output device" is intended to include all possible types of devices and ways to output information from system 900 to a human or to another machine or computer systems.

Network interface 920 provides an interface with outside networks including communication network 922. Through network interface 920, system 900 is able to communicate with other computer systems coupled to network 922. Network interface 920 may provide a wireline or wireless interface to network 922.

Many other devices or subsystems (not shown) may also be coupled to system 900. In addition, it is not necessary for all of the devices shown in FIG. 9 to be present to practice the invention. Furthermore, the devices and subsystems may be interconnected in configurations different from that shown in FIG. 9. The operation of a computer system such as that shown in FIG. 9 is readily known in the art and not described in detail herein. The source codes to implement various embodiments of the invention may be operatively disposed in memory subsystem 912 or stored on storage media such as a hard disk, a floppy disk, or a CD-ROM that is operative with a CD-ROM player, or some other media.

The contract management system described herein may be implemented using a "thick-client" model whereby software modules for the contract management system are installed on both the host server and client computers. The contract management system described herein may also be implemented using a "thin-client" model whereby software modules for the contract management system are installed only on the host server, and the client computers can access data and functionality from the host server via browsers executed on the client computers. The browser-based thin-client model can provide various advantages over the thick-client model including (1) ease of installation, since the software modules for the thin-client model are typically only installed on the host server and not on the client computers, (2) ease of maintenance, since upgrades and other maintenance tasks are performed only on the host server, (3) high level of connectivity, since any user with a browser and (web) access may be able to interact with the host server, and other benefits.

FIG. 1 shows a specific operating mode whereby the contract manager and the invoicing engine are located at the host server. Other operating modes may also be supported and are within the scope of the invention. For example, some or all of the contract manager, the invoicing engine, and the associated data may be provided to a client computer, which may then perform various functions described herein (e.g., automatically generate invoices for agreements). Thus, the techniques described herein may be implemented in a "connected" mode (e.g., as shown in FIG. 1) or a "disconnected" mode wherein a client computer may be able to perform various functions, and the data (e.g., invoices) may thereafter be synchronized during a subsequent connection with the host server.

Headings are included herein for reference and to aid in the locating certain sections. These heading are not intended to limit the scope of the concepts described therein under, and these concepts may have applicability in other sections throughout the entire specification.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. In a computer system, a method to automatically generate invoices, comprising:
    selecting a plurality of pre-existing contracts, using a processor of the computer system, wherein
        the plurality of pre-existing contracts comprise a plurality of pre-existing contract line items;
    adding user-defined plurality of contract line items to the plurality of pre-existing contracts;
    editing of the plurality of pre-existing contract line items to change the terms of at least one contract among the plurality of pre-existing contracts;

for each of the plurality of pre-existing contracts, identifying a plurality of pre-existing contract line items to be automatically invoiced, wherein each of the pre-existing contract line items relates to a respective sale of a product or service;

for one of the pre-existing contract line items to be automatically invoiced, calculating first and second billing amounts, wherein the first billing amount is calculated as a recurring charge (RC) for the product or service that is related to the one pre-existing contract line item, and the second billing amount is calculated as a non-recurring charge (NRC) for the product or service that is related to the one pre-existing contract line item; and generating, using the processor, a plurality of invoices for the plurality of pre-existing contracts, respectively, at least one of the invoices comprising the first and second billing amounts, wherein the generating the plurality of invoices further comprises generating the plurality of invoices according to a pre-defined invoice plan, the pre-defined invoice plan defines parameters for generating invoices for contract line items, and the parameters comprise invoice start, invoice end, invoice scheduling, invoice timing, invoice type, invoice status, invoice basis, last invoiced, advance to, use start, use plan, non-recurring start, non-recurring schedule, non-recurring plan, non-recurring quantity, recurring, recurring start, recurring schedule, recurring adjust, recurring adjust granularity, adjust invoice, adjust reason, cancel, cancel reason, or auto invoice.

2. A non-transitory computer-usable medium comprising computer-readable program codes for:

selecting a plurality of pre-existing contracts, wherein the plurality of pre-existing contracts comprise a plurality of pre-existing contract line items;

adding user-defined plurality of contract line items to the plurality of pre-existing contracts;

editing of the plurality of pre-existing contract line items to change the terms of at least one contract among the plurality of pre-existing contracts;

identifying pre-existing contract line items to be automatically invoiced for each of the plurality of pre-existing contracts, wherein each of the pre-existing contract line items relates to a respective sale of a product or service;

calculating first and second billing amounts for one of the pre-existing contract line items to be automatically invoiced based, wherein the first billing amount is calculated as a recurring charge (RC) for the product or service that is related to the one pre-existing contract line item, and the second billing amount is calculated as a non-recurring charge (NRC) for the product or service that is related to the one pre-existing contract line item; and generating a plurality of invoices for the plurality of pre-existing contracts, respectively, wherein one of the invoices comprises first and second pre-existing contract line items comprising the first and second billing amounts, respectively, the computer-readable codes for generating the plurality of invoices further comprise computer-readable codes for generating the plurality of invoices according to a pre-defined invoice plan, the pre-defined invoice plan defines parameters for generating invoices for contract line items, and the parameters comprise invoice start, invoice end, invoice scheduling, invoice timing, invoice type, invoice status, invoice basis, last invoiced, advance to, use start, use plan, non-recurring, non-recurring start, non- recurring schedule, non-recurring plan, non-recurring start, non-recurring schedule, non-recurring plan, non-recurring quantity, recurring, recurring start, recurring schedule, recurring adjust, recurring adjust granularity, adjust invoice, adjust reason, cancel, cancel reason, or auto invoice.

3. A contract management system comprising:

a contract manager comprising an invoice engine operative to select a plurality of pre-existing contracts, wherein the plurality of pre-existing contracts comprise a plurality of pre-existing contract line items, add user-defined plurality of contract line items to the plurality of pre-existing contracts, edit the plurality of pre-existing contract line items to change the terms of at least one contract among the plurality of pre-existing contracts, identify a plurality of pre-existing line items to be automatically invoiced for each of the plurality of pre-existing contracts, respectively, wherein each of the pre-existing contract line items relates to a respective sale of a product or service, and each pre-existing contract line item to be automatically invoiced is associated with a respective invoice plan and a respective invoicing schedule, for one of the pre-existing contract line items to be automatically invoiced, calculating first and second billing amounts according to the invoice plan for the one contract line item, wherein the first billing amount is calculated as a recurring charge (RC) for the product or service that is related to the one contract line item, and the second billing amount is calculated as a non-recurring charge (NRC) for the product or service that is related to the one contract line item, generate at least one invoice comprising a plurality of pre-existing contract line items for a plurality of billings, respectively, for each of the plurality of pre-existing contracts, and generate a plurality of invoices according to a pre-defined invoice plan, wherein the pre-defined invoice plan defines parameters for generating invoices for contract line items, and the parameters comprise invoice start, invoice end, invoice scheduling, invoice timing, invoice type, invoice status, invoice basis, last invoiced, advance to, use start, use plan, non-recurring, non-recurring start, non-recurring schedule, non-recurring plan, non-recurring quantity, recurring, recurring start, recurring schedule, recurring adjust, recurring adjust granularity, adjust invoice, adjust reason, cancel, cancel reason, or auto invoice; and a local storage device operatively coupled to the contract manager and configured to store the invoices.

4. The method of claim 1, wherein the first billing amount is calculated based on an RC schedule associated with the one pre-existing contract line item.

5. The method of claim 1, wherein the second billing amount is calculated based on an NRC plan associated with the one pre-existing contract line item.

6. The method of claim 5, wherein the NRC plan is selected from among a plurality of predefined NRC plans.

7. The method of claim 1, further comprising:
for the pre-existing one contract line item to be automatically invoiced, calculating a third billing amount for a use charge for the product or service that is related to the one pre-existing contract line item.

8. The method of claim 7, wherein the third billing amount is calculated based on a use plan associated with the one pre-existing contract line item.

9. The method of claim 8, wherein the use plan is selected from among a plurality of predefined use plans.

10. The method of claim 8, wherein each use plan defines one or more measurements to be used to determine a billing amount.

11. The method of claim 10, wherein each use plan further defines a pricing structure to be used for each measurement.

12. The method of claim 1, further comprising:
determining a third billing amount for the one pre-existing contract item, wherein the third billing amount is calculated as a credit for the product or service that is related to the one contract line item.

13. The method of claim 1, wherein each pre-existing contract line item is associated with a respective invoicing schedule.

14. The method of claim 13, wherein each invoicing schedule defines an invoicing period for the associated pre-existing contract line item.

15. The method of claim 14, wherein each invoicing schedule further defines a date in each invoicing period when invoices are to be generated.

16. The method of claim 1, wherein each pre-existing contract line item to be automatically invoiced is identified by a set flag.

* * * * *